Aug. 1, 1950 J. G. LOWNSBERY 2,517,328
MULTISPEED ATTACHMENT FOR ELECTRIC
MOTORS AND THE LIKE
Filed Feb. 10, 1948 2 Sheets-Sheet 1

INVENTOR.
John G. Lownsbery
BY
McMorrow, Berman & Davidson
Attorneys

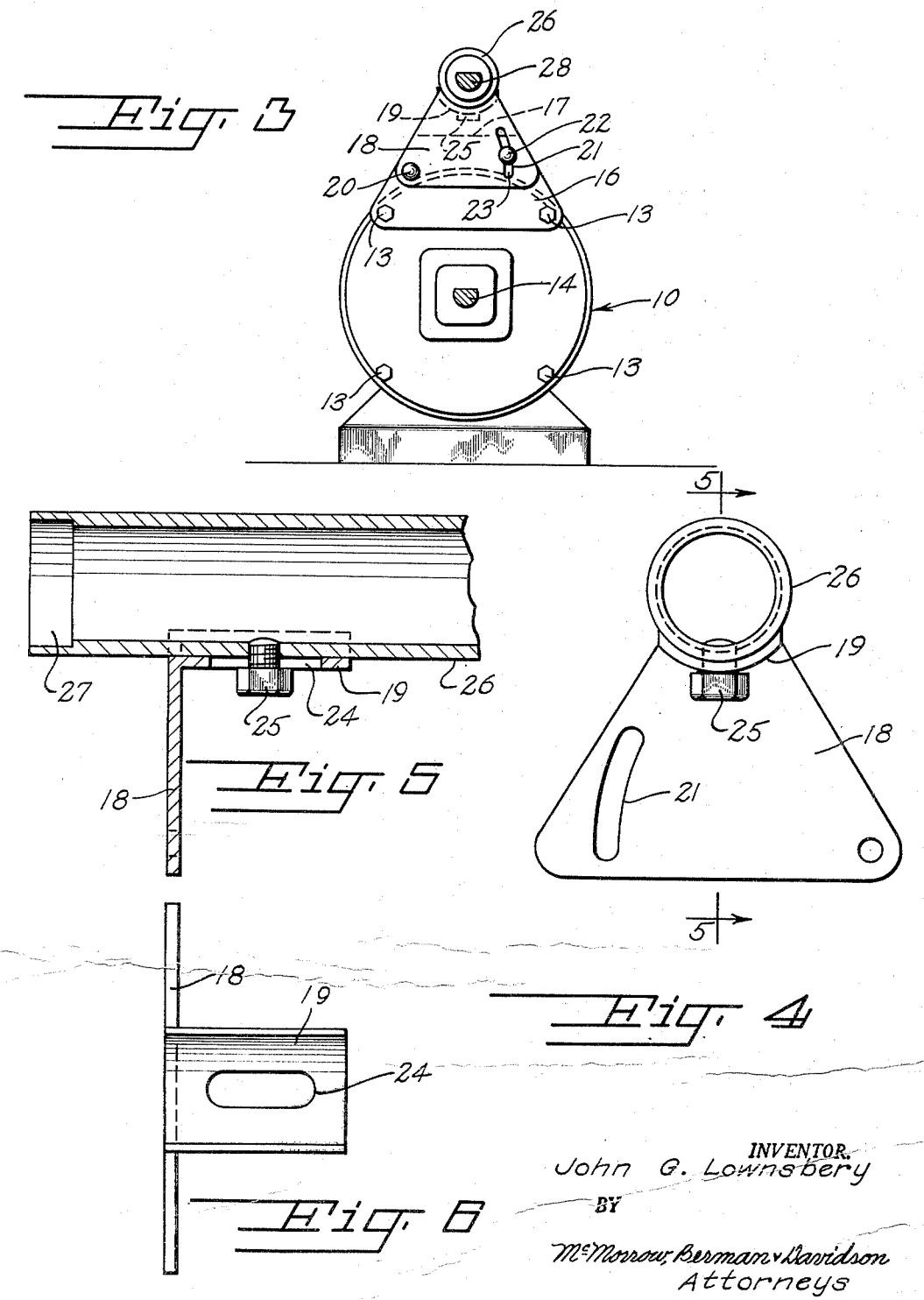

Patented Aug. 1, 1950

2,517,328

UNITED STATES PATENT OFFICE 2,517,328

MULTISPEED ATTACHMENT FOR ELECTRIC MOTORS AND THE LIKE

John G. Lownsbery, Norfolk, Va.

Application February 10, 1948, Serial No. 7,383

4 Claims. (Cl. 74—242.15)

My invention relates to a multi-speed attachment for electric motors, and the like.

An important object of the invention is to provide a multiple speed attachment which may be mounted directly upon the casing of any standard fractional horsepower electric motor.

A further object of the invention is to provide a multiple speed attachment for use in transmitting power to small tools, and the like, such attachment being light, extremely simple in design, and inexpensive to manufacture.

Other objects and advantages of the invention will be apparent during the course of the following description.

Figure 1:
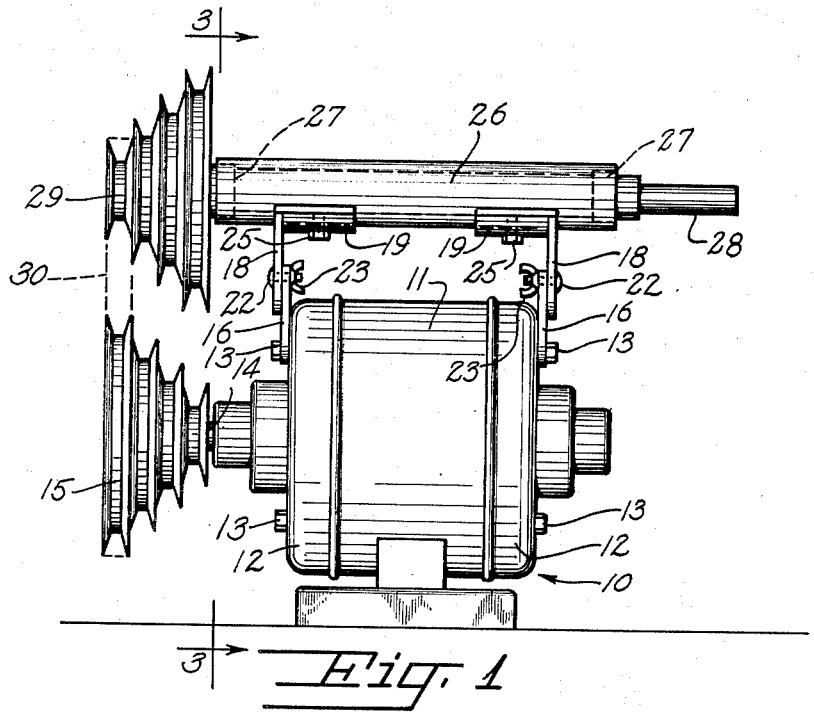
Figure 2:
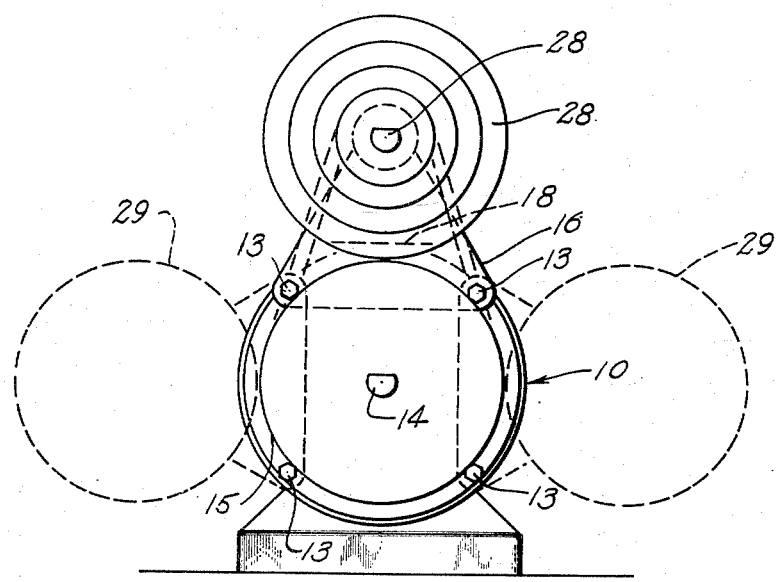

In the accompanying drawings, forming a part of this application, and in which like numerals are employed to designate like parts throughout the same, Figure 1 is a side elevation of an electric motor equipped with the multi-speed attachment embodying the invention, Figure 2 is an end elevation of the same, Figure 3 is a transverse vertical section taken on line 3—3 of Figure 1, Figure 4 is an enlarged end elevation of a bearing support tube and adjustable support bracket, Figure 5 is a fragmentary vertical section taken on line 5—5 of Figure 4, and, Figure 6 is a plan view of an adjustable support bracket removed.

In the drawings, where for the purpose of illustration is shown a preferred embodiment of the invention, the numeral 10 designates an electric motor, of any standard type, and including a casing comprising a main or center casing section 11 and end sections 12. The casing sections 11 and 12 are secured together by means of bolts 13, and the motor has a horizontally disposed armature shaft 14. Rigidly mounted upon the armature shaft 14, for rotation therewith, is a stepped cone-pulley 15, of conventional design.

Rigidly mounted upon the outer sides of the end sections 12 of the motor casing, and secured in place by pairs of the casing bolts 13, are flat upstanding mounting plates 16. The plates 16 are upwardly tapered or generally triangular, as shown in Figure 3, and the top edge 17 of each plate 16 is above the top of the motor casing.

Adjustably mounted upon the outer sides of the mounting plates 16, and projecting upwardly therefrom, are adjustable support brackets 18, including flat vertical triangular shaped plates, to the top ends of which are permanently rigidly secured inwardly projecting horizontal circularly curved plates or seats 19. The brackets 18 have openings near one of their lower corners to receive pivot bolts 20, or the like, and these bolts 20 extend through the mounting plates 16, as shown. The brackets 18 have substantially vertical arcuate slots 21 near their sides opposite to the pivot bolts 20, and the slots 21 receive bolts 22, carrying wing-nuts 23. The bolts 22 extend through openings in the mounting plates 16. The brackets 18 are pivoted to the plates 16 through the corner bolts 20. The curved seats 19 have longitudinal adjusting slots 24, receiving screws 25, engaging in screw threaded openings in a cylindrical tubular bearing support tube 26. The tube 26 engages upon the curved seats 19, and is supported by the brackets 18, as shown. The tube 26 has end recesses 27, to receive bearings, such as ball bearings. Rotatably mounted within the bearing support tube 26 is a horizontal shaft 28, upon one end of which is rigidly mounted a stepped cone-pulley 29. The pulley 29 has its end having a smaller diameter disposed outwardly, while the small diameter of the pulley 15 is disposed innermost. The pulley 29 is disposed directly above the pulley 15, and the V-shaped belt grooves of the pulleys are in vertical alignment. A V-belt 30 engages over the pulleys 15 and 29, and the belt is driven by the pulley 15, to drive the shaft 28.

In use, the multi-speed attachment may be applied to motors of various lengths. The screws 25 are loosened, and the brackets 18 are adjusted longitudinally of the tube 26, until the plates 16 are adjacent to the ends of the casing sections 12. The screws 25 are then tightened and the plates 16 are secured beneath the bolts 13, as shown. The tension in the belt 30 is adjusted by loosening the wing nuts 23, and pivoting the brackets 18 about the bolts 20. The arcuate slots 21 permit this adjustment, which is necessary when moving the belt 30 from one pair of pulley grooves to another pair, when changing the speed of rotation of shaft 28.

As shown in dotted lines in Figure 2, the multi-speed attachment may be mounted upon either side of the motor casing, if desired. To do this, a vertical pair of the casing bolts 13 are used to secure the plates 16 in place.

It is to be understood that the form of the invention, herewith shown and described is to be taken as a preferred example of the same, and that various changes in the shape, size and arrangement of parts may be resorted to without departing from the spirit of the invention, or the scope of the subjoined claims.

Having thus described the invention, I claim:

1. A multi-speed attachment for electric motors, comprising a stepped cone-pulley mounted upon the armature shaft of the motor for rotation therewith, mounting plates secured to the ends of the motor casing and projecting above the same, adjustable support brackets arranged in side-by-side relation with respect to said mounting plates and pivotally connected with the mounting plates, means connecting the mounting plates and support brackets for clamping the brackets in the selected adjusted position, a tube mounted upon the support brackets and adjustable longitudinally with respect to the same, a shaft rotatably mounted upon the support member, and a stepped cone-pulley mounted upon the shaft and disposed above the first named cone-pulley.

2. A multi-speed attachment for electric motors, comprising plates secured to the ends of the motor casing and projecting radially thereof, support brackets mounted upon the plates and extending outwardly therefrom and pivotally connected therewith, the brackets being provided with arcuate slots to permit of their pivotal adjustment, clamping means carried by the plates and projecting into the slots for clamping the brackets in the selected adjusted position, a tube supported by the support brackets and adjustable longitudinally with respect to the same, a shaft rotatably mounted within the tube, and a stepped cone-pulley mounted upon the shaft for rotation therewith.

3. A multi-speed attachment for electric motors, comprising a stepped cone-pulley mounted upon the armature shaft of the motor for rotation therewith, radially projecting mounting plates mounted upon the ends of the motor casing and secured in place by the casing bolts, support brackets pivotally connected with the mounting plates and projecting radially therefrom and being provided with arcuate slots, said support brackets including transversely curved seats having longitudinal slots formed therein, the seats being disposed substantially at right angles to the plates, bolts carried by the plates and projecting into the arcuate slots, clamping nuts carried by the bolts, a tubular bearing support mounted upon the curved seats and extending longitudinally thereof and parallel to the motor armature shaft, screws connecting the bearing support and seats and projecting into the longitudinal slots, a shaft rotatably mounted within the bearing support, a stepped cone-pulley mounted upon the shaft and disposed above the first-named cone-pulley and having its small end disposed opposite from the small end of the first-named cone-pulley, and a belt mounted upon the cone pulleys for connecting the same.

4. A multi-speed attachment for electric motors, comprising flat upstanding mounting plates mounted upon the opposite ends of the motor casing and secured in place by the casing bolts, support brackets pivotally connected with the mounting plates and including substantially horizontal circularly curved seats having longitudinal slots, the support brackets having circularly curved slots, clamping means carried by the mounting plates and projecting into the curved slots to permit the pivotal adjustment of the brackets, a cylindrical tube mounted upon the curved seats, screws connecting the tube and seats and extending into the longitudinal slots, a shaft rotatably mounted within the tube, and a stepped cone-pulley mounted upon the shaft.

JOHN G. LOWNSBERY.

REFERENCES CITED

The following references are of record in the file of this patent:

UNITED STATES PATENTS

| Number | Name | Date |
| --- | --- | --- |
| 2,430,798 | Alexander | Nov. 11, 1947 |